United States Patent [19]

Ippen et al.

[11] Patent Number: 4,467,852

[45] Date of Patent: Aug. 28, 1984

[54] TIRE FOR LORRIES

[75] Inventors: Jakob Ippen, Leverkusen; Friedel Stüttgen, Pulheim, both of Fed. Rep. of Germany

[73] Assignee: Bayer Aktiengesellschaft, Fed. Rep. of Germany

[21] Appl. No.: 418,748

[22] Filed: Sep. 16, 1982

[30] Foreign Application Priority Data

Sep. 29, 1981 [DE] Fed. Rep. of Germany ....... 3138582

[51] Int. Cl.³ .......................... B60C 3/00; B60C 17/04
[52] U.S. Cl. .................................... 152/158; 152/325; 152/327; 152/330 RF; 152/342; 152/352 R; 152/353 R; 156/113

[58] Field of Search ................ 152/151, 152, 157–158, 152/246, 318–322, 323–329, 330 RF, 331, 339–340, 342, 352 R, 352 A, 353 R, 353 C, 353 G, 357 A; 156/112–113

[56] References Cited

U.S. PATENT DOCUMENTS

| 485,633 | 12/1892 | Keating | 152/328 |
| 1,815,507 | 8/1931 | Harter | 152/325 |
| 2,600,033 | 6/1952 | Walklet | 152/322 |

*Primary Examiner*—Lois E. Boland
*Attorney, Agent, or Firm*—Connolly and Hutz

[57] ABSTRACT

A lorry tire which is filled with compressed air during normal operation and which has the necessary stability for continued movement and has adequate running properties even in the case of a loss of air, due to its low height to width ratio, its flat tread curvature and its relatively rigid and thick sidewalls.

8 Claims, 5 Drawing Figures

TIRE FOR LORRIES

BACKGROUND OF THE INVENTION

This invention relates to a tire for lorries which is filled with compressed air and which still has adequate running properties and adequate stability even when air is lost, due to its particular shaping and to the relatively rigid side walls of the tire.

In conventional air-filled lorry tires, the supporting element is the carcass. In principle, the carcass is a hollow body in the form of a torus made of vulcanized rubber which contains reinforcing elements (textile threads or steel cord threads) which may be subjected to tension. The hollow body is filled with air under excess pressure and the side walls thereof are under tensile stress. The weight of the vehicle counteracts this tensile stress and eliminates it to a certain extent. If a tire of this type has a puncture and loses its internal pressure, then the compressive strain produced by the weight of the vehicle predominates. The tire loses its shape and disintegrates very quickly as it turns.

SUMMARY OF THE INVENTION

This disadvantage is overcome by a tire according to the present invention. This tire has a low height to width ratio and the tire has a transverse radius of curvature which is outwardly relatively flat. The tire side walls are of a relatively thick and rigid design and are fitted to the contour of the rim. They are positioned on the rim and are supported externally by the rim flanges.

The present invention provides a lorry tire, characterised in that the height to width ratio thereof is from 0.3 to 0.5:1, the transverse radius of curvature thereof is from 0.9 to 1.1 times the tire width and the thickness of each tire side wall at the height of the rim flange is from 12 to 20% of the tire width.

The height to width ratio is preferably from 0.35 to 0.45:1 and is particularly preferably 0.4:1. The transverse radius of curvature of the tire is preferably the same as the tire width. The thickness of each tire side wall is preferably from 14 to 18% of the tire width.

The tire side walls are preferably designed such that the inside wall thereof extends radially from the axis of the tire, while the outside wall thereof extends obliquely from the rim flange to the tire shoulder and the tire has its greatest moment of resistance in the region of the rim flange.

The tire is suitably mounted on a multipart rim. A firm, rigid seat is also ensured by an encirculating textile cord core or a wire core in the foot of the tire side walls. An encircling groove is also provided above this core in the tire shoulders which facilitates the necessary movements of the upper part of the tire with respect to the rigid tire side walls.

The inner surface of the upper part of the tire generally extends parallel to the base of the rim. Due to the transverse radius of curvature of the tire, the thickness of the upper part of the tread increases from the shoulders to the center, and at the zenith, it amounts to from 40 to 55, preferably from 45 to 50% of the overall tire height. There are up to four, preferably two, encircling profiled grooves in the tread which, like the groove in the tire shoulder, have a depth of from 8 to 12%, preferably a depth of 10% of the tire height. Moreover, the upper part of the tire is reinforced by an encircling insert of steel or textile core, as a result of which, an undesired distention caused by centrifugal force is also avoided in the zenith of the tire during movement. Due to the transverse radius of curvature of the tire not only is a good pressure distribution achieved in the upper part of the tire towards the shoulder, but a good holding of the pressurized tire to the ground is also achieved. Thus, the necessary spring suspension comfort is achieved during movement, without the rigid side walls of the tire moving substantially.

DETAILED DESCRIPTION OF THE INVENTION

Figure 1:
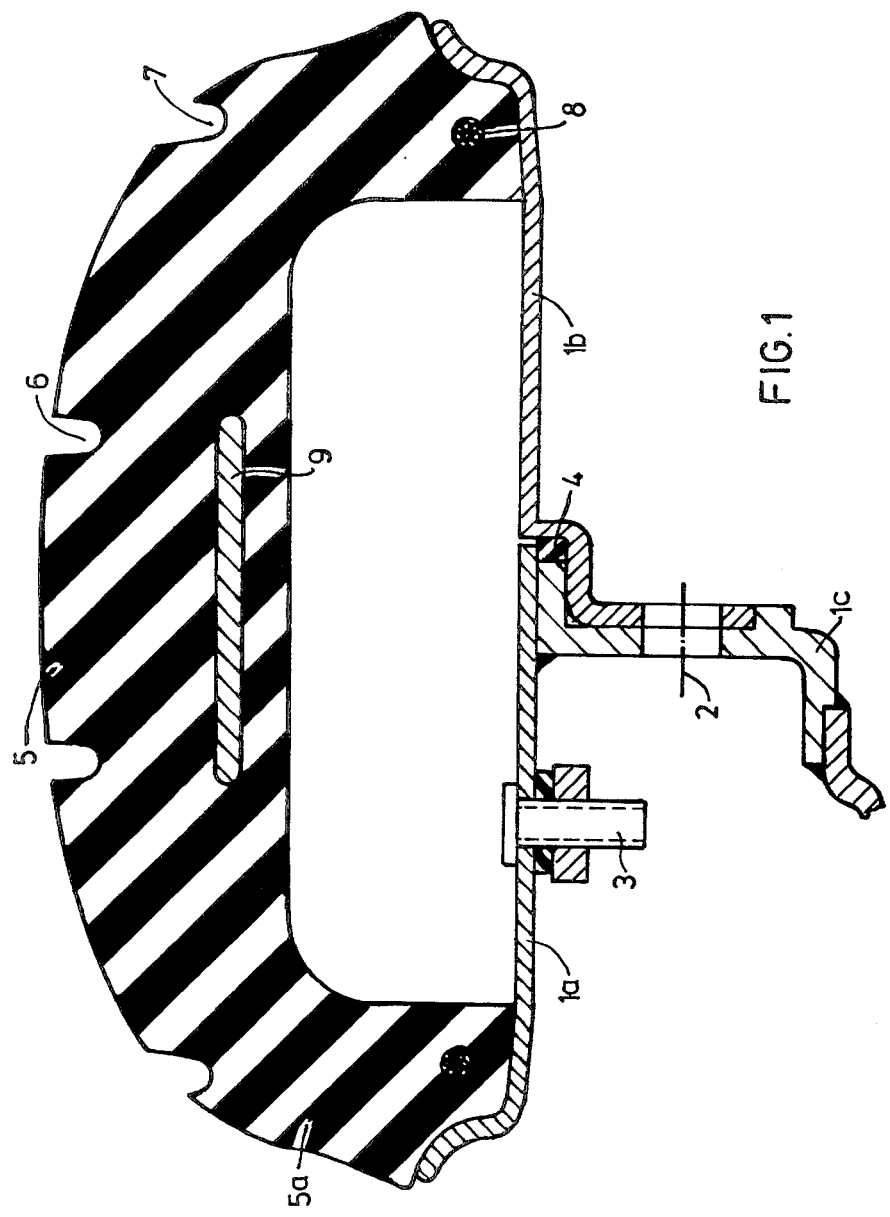
FIG. 1 is a cross sectional view of a tire according to the present invention.

FIG. 1 shows a cross section through an inflated tire according to the present invention which is mounted on a multipart rim (1a, b, c). The rim is held together by 4 to 6 screws (2) which are distributed over the circumference and it has a valve (3) and a sealing ring (4) on the dividing point of the rim. Due to these measures and to the firm seat of the tire with the upper part (5) and the tire side walls (5a) on the rim, the cavity which is filled with compressed air is outwardly sealed in an air-tight manner. The foot of each tire side wall is fitted to the contour of the rim and is reinforced by an encircling core (8). The inner surface of each side wall extends perpendicular, to the axis of the tire whereas the outside is supported by the rim flange and from there extends obliquely upwards to the tire shoulder which has an encircling groove (7). The upper part of the tire has an encircling reinforcement (9) and has encircling profiled grooves (6) in the tread. The inside of the upper part extends approximately level and parallel to the base of the rim.

Figure 2:
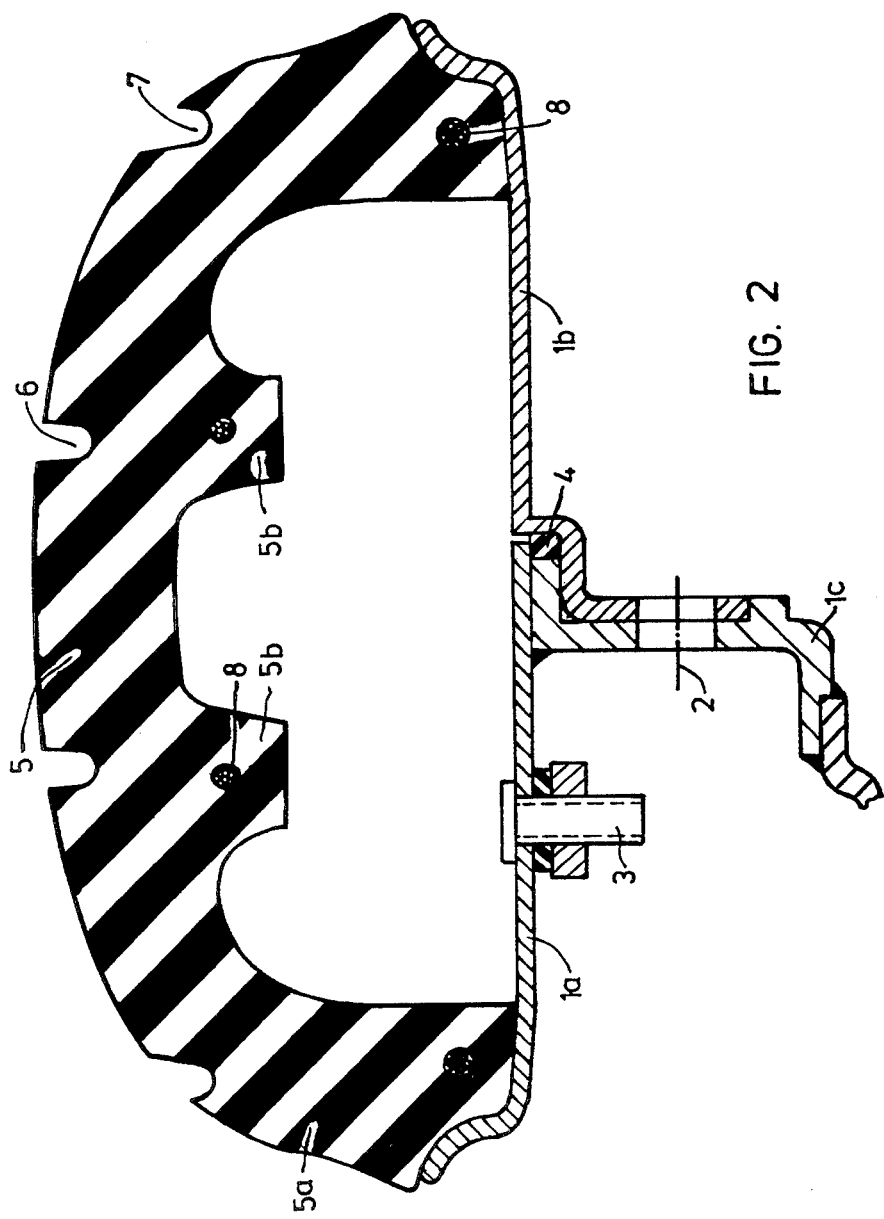
FIG. 2 is a cross sectional view of another tire according to the present invention.

Another embodiment is illustrated in FIG. 2. In this case, the inside of the upper part (5) is interrupted by openings which in each case are made approximately up to half the height of the upper part. Consequently, the inside has the contour as illustrated in FIG. 2. having the encircling ridges (5b) which are positioned below the profiled grooves (6) and are reinforced, as are the side walls (5a), by encircling cores (8). The other reference numerals in FIG. 2 have the same meaning as those in FIG. 1.

Figure 3:
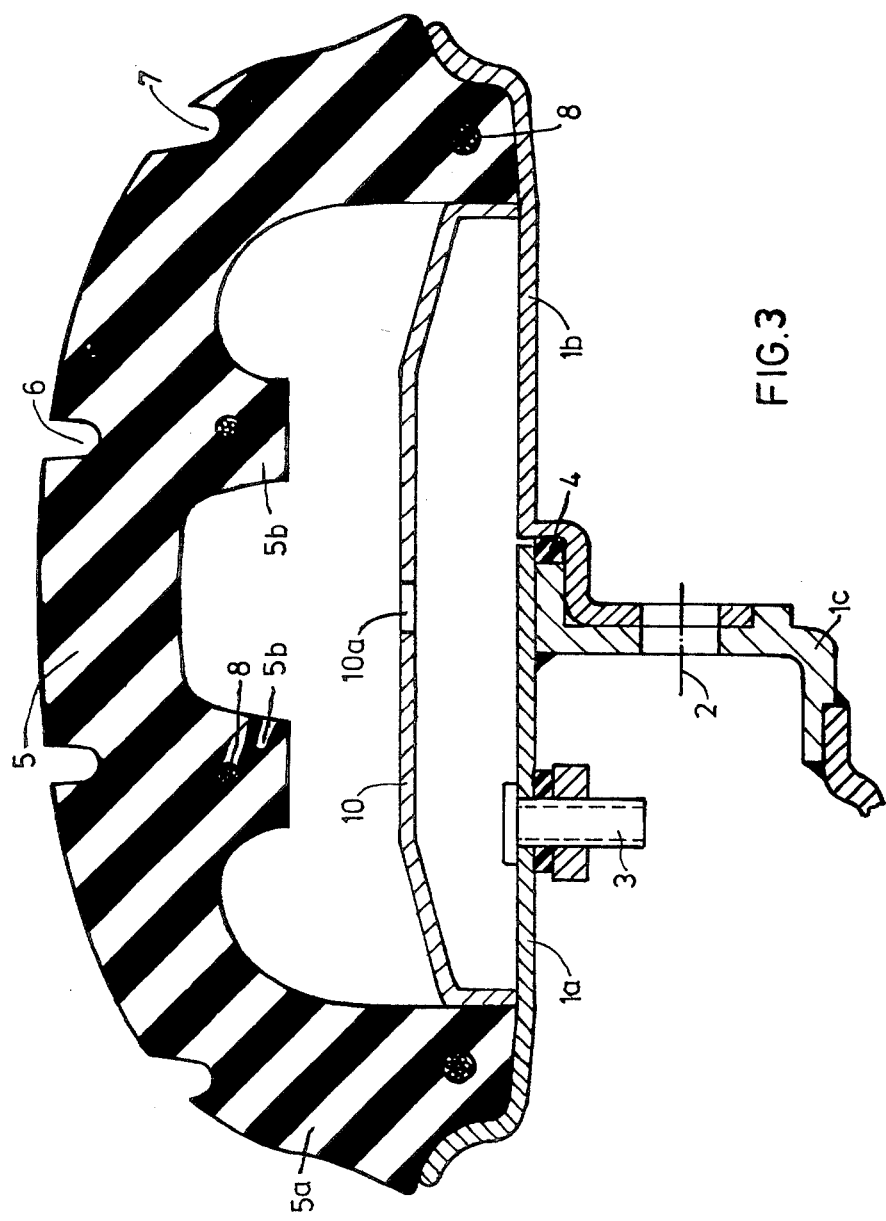
FIG. 3 is a cross sectional view of still another tire according to the present invention.

In a modification of this embodiment, the tire also contains an encircling supporting ring (10) resting on the rim (1a, b), as illustrated in FIG. 3. The ring (10) has several holes (10a) distributed over the circumference for the passage of air. The side walls of the supporting ring rest firmly on the inside surface of the each tire side wall (5a). The spacing between the supporting ring and the ridges (5b) is calculated such that during normal operation, the spring suspension movements of the upper part (5) of the tire are not impaired. The supporting ring may be made of any material suitable for this purpose, for example plastics or metal.

Figure 4:
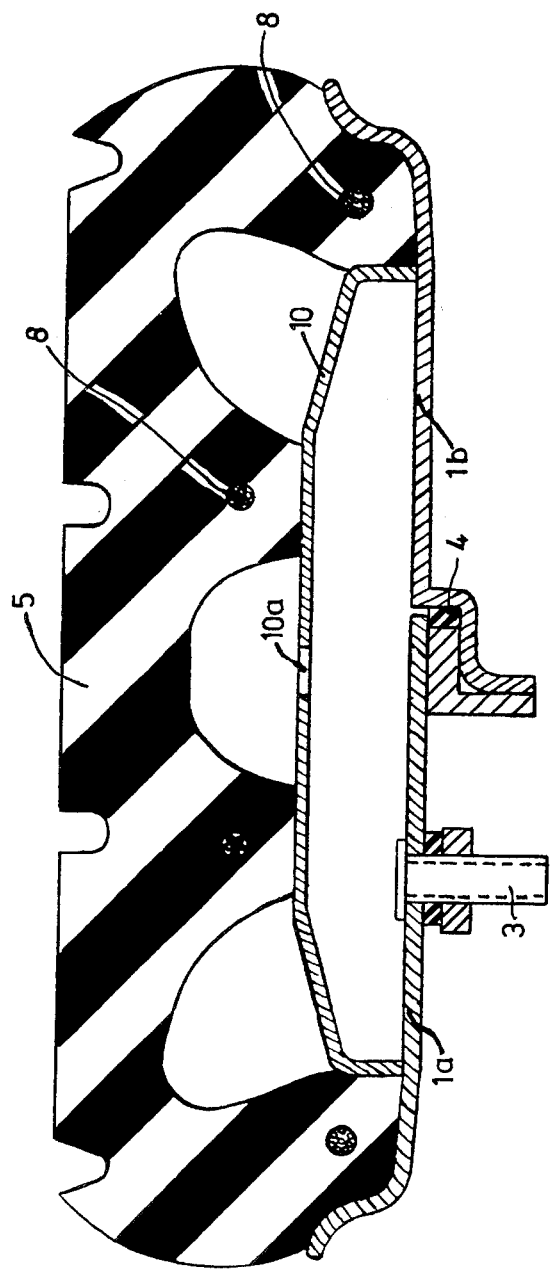
FIG. 4 is a cross sectional view of the tire of FIG. 3 in its collapsed condition.

FIG. 4 illustrates tire of this type where pressure has been lost. In this case, the supporting ridges are positioned on the supporting ring 10 such that the tread forms a practically flat surface, while the side walls of the tire do not substantially change.

In the embodiments illustrated in FIGS. 1 and 2 as well, only the upper part of the tire undergoes a corresponding change in form when there is a loss of pressure, while the rigid tire side walls retain their shape and are substantially unchanged. As a result of the low height to width ratio, the deformation of the tire is so low when there is a pressure loss that it still has adequate running properties and an adequate stability and may continue to move without problems even on bends.

Figure 5:
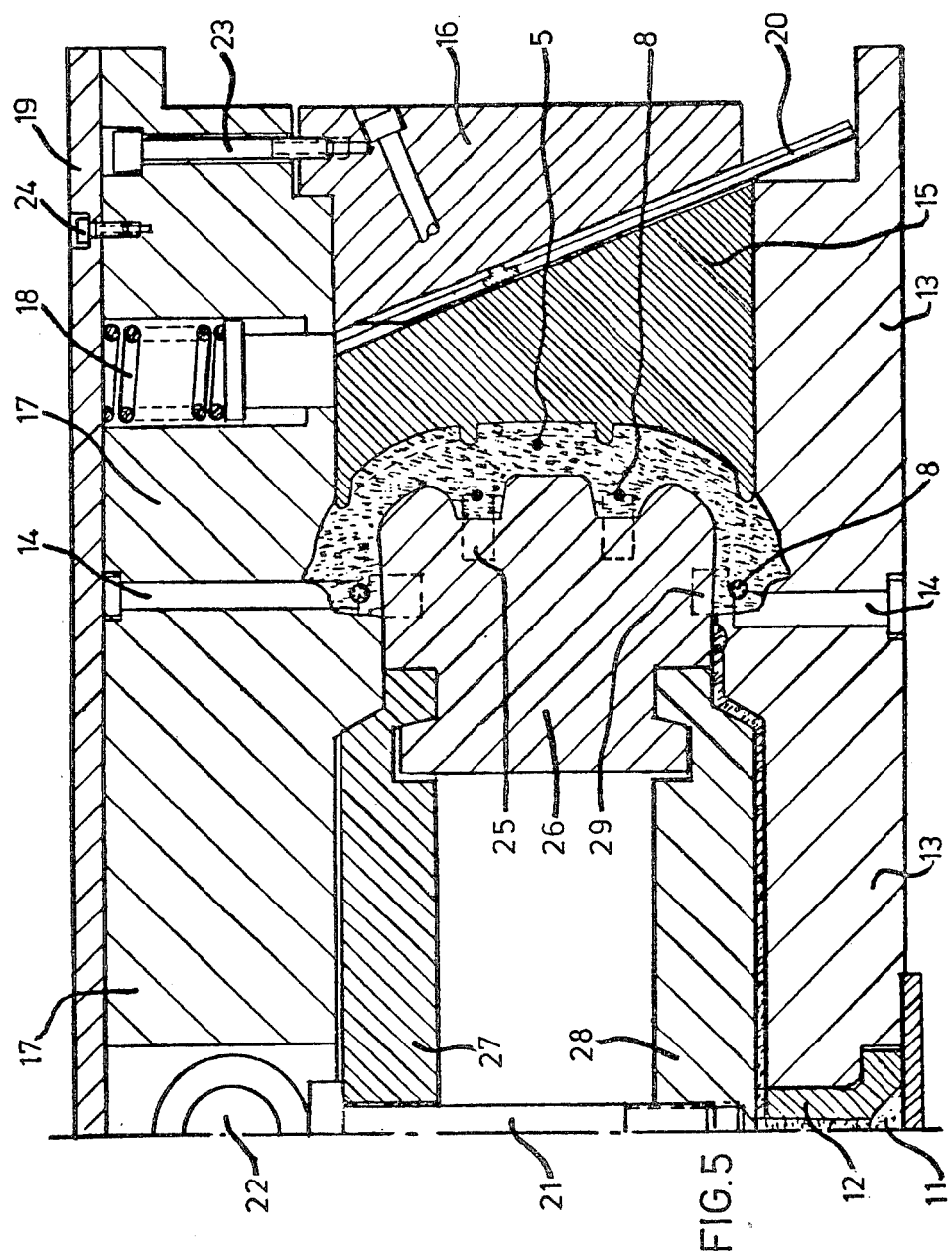
FIG. 5 is a cross sectional view illustrating the production of the tires of the present invention.

FIG. 5 illustrates the production of the tire shown in FIG. 2 or in FIG. 3 in a conventional injection molding press which is illustrated in section in this Fig. The reference numerals denote the following:

(11) Injection channel for the tire
(8) Wire cores of the tire
(14), (29) and (25) plate holding devices for the wire cores
(17) and (19) Upper part of the muld
(18) Springs
(15) Segments having a slanting conical surface for withdrawing the molding from the base of the profile
(16) Lifting body having a dovetail groove which is connected to the upper part of the mold by the attachment (23)
(24) Attachment part between the two upper parts (17) and (19) of the mold
(13) Lower parts of the mold,
(26) Segmented molding, parts
(27) and (28) centering flange for the segmented core,
(21) Attachment of the centering flange,
(22) Transport hook,
(12) Insertion sleeve for the injection channel.

The wire core (8) is inserted into the plate holding device (14) in the lower part (13) of the mold. The inner parts (26, 28, 27, 21) are then introduced into the mold via the transport hook (22). Before assembly, the other wire cores (8) are fitted to the plate holding devices (25). Thereafter, the last wire core (8) is positioned on the upper plate. Subsequently thereto, the constructional parts (17, 19, 16 and 15) move downwards, actuated by a piston. During this movement, the constructional part (15) is pressed inwardly to such an extent by the cone (20) until the press is closed. The tire is then filled via the injection channel (11). The presses are opened in the reverse sequence, with the Belleville spring (18) further increasing the lifting effect. After the profiled segments (15) have moved back outwardly via the wedge (20) and the press has been opened, the tire and the inner molded parts (21, 28, 27, 26) are removed, again by the transport hook (22). The tire is then opened at a central point for being released from the mold, while a second core which has already previously been mounted is introduced into the mold and the next tire is produced in the above-described manner. Depending on the rubber mixture which is used, the tire is heated at a temperature of from 145° to 175° C. for 5 to 8 minutes.

Unlike conventional tires, this tire does not have to be composed of several layers of different material, but may be produced from a homogeneous rubber or rubber mixture, apart from the encircling wire or textile reinforcements. Any natural or synthetic rubbers are suitable, the vulcanizates of which have a Shore hardness of from 55 to 90 and have a tension value of from 100 to 200 kp/cm$^2$ at 300% elongation. The following rubbers are particularly suitable: natural rubber, styrene-butadiene rubber, polybutadiene rubber and ethylene-propylene-terpolymer rubber.

The properties and main constituents of suitable rubber mixtures are provided by way of example in the following.

| (1) | |
|---|---|
| Natural Rubber | 25.0 parts by weight |
| Styrene-butadiene-copolymer | 25.0 parts by weight |
| cis-1,4-polybutadiene | 50.0 parts by weight |
| Carbon black N-330 | 80.0 parts by weight |
| Mixture plasticity/80° C. | 7700/17 |
| Deformation hardness/ deformation elasticity | |
| Tensile strength (MPa) | 19.9 |
| Elongation at break (%) | 310 |
| Tension value at 300% elongation (MPa) | 19.1 |
| Tear propagation resistance acc. to Pohle (N) | 160 |
| Hardness (Shore A) at 20° C. | 82 |

| (2) | |
|---|---|
| Natural rubber | 80.0 parts by weight |
| cis-1,4-polybutadiene | 20.0 parts by weight |
| Carbon black N-330 | 55.0 parts by weight |
| Aromatic mineral oil | 3.0 parts by weight |
| Mixture plasticity/80° C. | 1100/15 |
| Deformation hardness/ deformation elasticity | |
| Tensile strength (MPa) | 21.9 |
| Elongation at break (%) | 460 |
| Tension value at 300% elongation (MPa) | 13.0 |
| Tear propagation resistance acc. to Pohle (N) | 370 |
| Hardness (Shore A) at 20° C. | 66 |
| Oil-stretched styrene-butadiene copolymer | 68.5 parts by weight |
| Oil-stretched cis-1,4-polybutadiene | 68.5 parts by weight |
| Carbon black N-220 | 95.0 parts by weight |
| Aromatic mineral oil | 20.0 parts by weight |
| Mixture plasticity/80° C. | 1550/16 |
| Deformation hardness/ deformation elasticity | |
| Tensile strength (MPa) | 15.5 |
| Elongation at break (%) | 410 |
| Tension value at 300% elongation (MPa) | 10.8 |
| Tear propagation resistance acc. to Pohle (N) | 240 |
| Hardness (Shore A) at 20° C. | 66 |

However, specific rubber mixtures may also be used for the tire side walls, which mixtures are optionally reinforced by an addition of, for example, modified novolaks or glass fibers and have a higher Shore hardness.

The properties and main constituents of such rubber mixtures are provided by way of example in the following:

| (1) | |
|---|---|
| Natural rubber | 75.0 parts by weight |
| cis-1,4-polybutadiene | 25.0 parts by weight |
| Carbon black N 347 | 40.0 parts by weight |
| active, precipitated silicic acid | 30.0 parts by weight |
| modified novolak | 30.0 parts by weight |
| Mixture plasticity/80° C. | 2250/11 |
| Deformation hardness/ | |

|  |  |
| --- | --- |
| deformation elasticity |  |
| Tensile strength (MPa) | 14.1 |
| Elongation at break (%) | 270 |
| Tension value at 300% elongation (MPa) | 6.5 |
| Tear propagation resistance acc. to Pohle (N) | 180 |
| Hardness (Shore A) at 20° C. | 89 |

|  |  |
| --- | --- |
| (2) |  |
| Natural rubber | 57.0 parts by weight |
| Styrene-butadiene rubber | 43.0 parts by weight |
| Carbon black N 220 | 62.0 parts by weight |
| Carbon black N 326 | 30.0 parts by weight |
| Glass fibres | 15.0 parts by weight |
| Mixture plasticity/80° C. | 4550/15 |
| Deformation hardness/ deformation elasticity |  |
| Tensile strength (MPa) | 14.3 |
| Elongation at break (%) | 110 |
| Tension value at 300% elongation (MPa) | 13.1 |
| Tear propagation resistance acc. to Pohle (N) | 150 |
| Hardness (Shore A) at 20° C. | 93 |

|  |  |
| --- | --- |
| (3) |  |
| Natural rubber | 75.0 parts by weight |
| cis-1,4-polybutadiene | 25.0 parts by weight |
| Carbon black N 347 | 70.0 parts by weight |
| Modified novolak | 30.0 parts by weight |
| Mixture plasticity/80° C. | 2550/17 |
| Deformation hardness/ deformation elasticity |  |
| Tensile strength (MPa) | 13.1 |
| Elongation at break (%) | 130 |
| Tension value at 300% elongation (MPa) | 9.9 |
| Tear propagation resistance acc. to Pohle (N) | 160 |
| Hardness (Shore A) at 20° C. | 94 |

We claim:

1. A pneumatic tire and a tire rim with side flanges outwardly extending therefrom, the tire having an air filled hollow cavity and having no carcass reinforcing elements, characterized in that the height to width ratio thereof is from 0.3 to 0.5:1, the transverse radius of curvature thereof is from 0.9 to 1.1 times the tire width, and the thickness of each tire side wall at the height of the rim flange is from 12 to 20% of the tire width.

2. A pneumatic tire as in claim 1 wherein each tire side wall has an inner surface that extends perpendicular to the axis of rotation of the tire, each tire side wall having an outer surface that extends obliquely from the rim flange to a shoulder portion of the tire, and the tire having its greatest moment of resistance in the region of the rim flange.

3. A pneumatic tire as in claim 1 wherein the hollow cavity has an inner surface formed in part by encircling ridge portions, and a tread groove radially outward of each ridge portion.

4. A pneumatic tire as in claim 2 wherein the hollow cavity has an inner surface formed in part by encircling ridge portions, and a tread groove radially outward of each ridge portion.

5. A pneumatic tire as in claim 3 including a supporting ring in the hollow cavity of the tire engaging the rim and spaced between the rim and the encircling ridge portions for supporting the ridge portions upon loss of pressure in the hollow cavity.

6. A pneumatic tire as in claim 3 wherein the tire is made of rubber with the tire side walls made of a harder rubber than the remainder of the tire.

7. A pneumatic tire as in claim 6 wherein the tire side walls are reinforced with modified novolaks.

8. A pneumatic tire as in claim 6 wherein the tire side walls are reinforced with glass fibers.

* * * * *